(12) United States Patent
Shi

(10) Patent No.: US 9,953,150 B2
(45) Date of Patent: Apr. 24, 2018

(54) PROCESSING METHOD AND SYSTEM FOR IDENTITY AUTHENTICATION WITH MOBILE TERMINAL BASED ON IRIS RECOGNITION

(71) Applicant: Huizhou TCL Mobile Communication Co., Ltd., Huizhou, Guangdong (CN)

(72) Inventor: Zhen Shi, Guangdong (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/890,279

(22) PCT Filed: Sep. 5, 2014

(86) PCT No.: PCT/CN2014/085964
§ 371 (c)(1),
(2) Date: Nov. 10, 2015

(87) PCT Pub. No.: WO2015/192482
PCT Pub. Date: Dec. 23, 2015

(65) Prior Publication Data
US 2016/0180070 A1  Jun. 23, 2016

(30) Foreign Application Priority Data

Jun. 16, 2014 (CN) .......................... 2014 1 0266670

(51) Int. Cl.
*G06F 21/32* (2013.01)
*H04W 12/06* (2009.01)
(Continued)

(52) U.S. Cl.
CPC ........ *G06F 21/32* (2013.01); *G06F 17/30256* (2013.01); *G06K 9/00597* (2013.01);
(Continued)

(58) Field of Classification Search
None
See application file for complete search history.

(56) References Cited

U.S. PATENT DOCUMENTS 9,600,649 B2 * 3/2017 Parry .................. H04L 63/0861
9,740,848 B2 * 8/2017 Parry ..................... G06F 21/36
(Continued)

FOREIGN PATENT DOCUMENTS

CN 102354359 A 2/2012
CN 102981736 A 3/2013
(Continued)

*Primary Examiner* — Saleh Najjar
*Assistant Examiner* — Michael W Chao

(57) ABSTRACT

A processing method and system for identity authentication with a mobile terminal based on iris recognition is provided. The iris characteristic data of the user is encapsulated as iris identification data, which is further established as a unique identifier of the user for identity authentication. The mobile terminal compares the scanned iris characteristic data of the current user against the prestored iris identification data. When the iris characteristic data of the current user is in match with the prestored iris identification data, the mobile terminal is unlocked. Iris recognition is employed to verify the identity of the user, so as to control unlock the mobile terminal and log into the application.

17 Claims, 4 Drawing Sheets

(51) Int. Cl.
*G06F 17/30* (2006.01)
*G06K 9/00* (2006.01)
*H04M 1/66* (2006.01)
*H04L 29/06* (2006.01)
*H04L 9/32* (2006.01)

(52) U.S. Cl.
CPC ..... *G06K 9/00604* (2013.01); *G06K 9/00617* (2013.01); *G06K 9/00926* (2013.01); *H04L 63/0861* (2013.01); *H04M 1/66* (2013.01); *H04W 12/06* (2013.01); *H04L 9/3231* (2013.01); *H04M 2250/52* (2013.01)

(56) References Cited

U.S. PATENT DOCUMENTS

| | | | |
|---|---|---|---|
| 9,762,573 B2* | 9/2017 | Li | H04L 63/0861 |
| 9,836,647 B2* | 12/2017 | Perna | G06K 9/00604 |
| 2002/0131623 A1 | 9/2002 | Musgrave et al. | |
| 2007/0057764 A1 | 3/2007 | Sato et al. | |
| 2010/0024023 A1* | 1/2010 | Bair | H04L 9/3231 726/8 |
| 2010/0138914 A1* | 6/2010 | Davis | G06F 21/32 726/19 |
| 2010/0257369 A1* | 10/2010 | Baker | G06F 21/32 713/186 |
| 2011/0206243 A1 | 8/2011 | Vlcan | |
| 2014/0033301 A1 | 1/2014 | Zhang | |
| 2014/0136702 A1 | 5/2014 | Kwon et al. | |
| 2014/0283012 A1* | 9/2014 | Eggerton | G06F 21/31 726/19 |
| 2014/0354401 A1* | 12/2014 | Soni | G06F 21/32 340/5.52 |
| 2015/0033364 A1 | 1/2015 | Wong | |
| 2015/0350200 A1* | 12/2015 | Li | H04L 63/0861 726/8 |
| 2016/0188023 A1* | 6/2016 | Chang | G06K 9/00013 345/173 |
| 2017/0193215 A1* | 7/2017 | Parry | H04L 63/0861 |
| 2018/0018454 A1* | 1/2018 | Parry | G06F 21/36 |

FOREIGN PATENT DOCUMENTS

| | | |
|---|---|---|
| CN | 103218142 A | 7/2013 |
| CN | 103413072 A | 11/2013 |
| CN | 203433529 U | 2/2014 |
| CN | 103839054 A | 6/2014 |

* cited by examiner

PROCESSING METHOD AND SYSTEM FOR IDENTITY AUTHENTICATION WITH MOBILE TERMINAL BASED ON IRIS RECOGNITION

FIELD OF THE DISCLOSURE

The present disclosure relates to the technical field of consumer electronics, and in particular, to a processing method and system for identity authentication with a mobile terminal based on iris recognition.

BACKGROUND OF THE DISCLOSURE

With the development of mobile communications and continuous improvement of people's living standards, various mobile terminals, for example, mobile phones, are becoming more and more popular. Mobile phones have become an indispensable communication tool in people's lives.

Mobile phones in the prior art are having more and more functions, while the security issues of mobile phones cannot be ignored. Ways to unlock a mobile terminal in the prior art are cumbersome. The same goes with existing ways to login on an application by utilizing a user name and a password, however, if an individual's account and password are saved in the application, no good security mechanisms can be utilized to ensure security, resulting in security risk.

Therefore, the prior art has yet to be improved and developed.

SUMMARY OF THE DISCLOSURE

The technical problem the present disclosure attempting to solve is, directing at the aforementioned deficiencies existing in the prior art, to provide a processing method and system for identity authentication with a mobile terminal based on iris recognition. Iris recognition technologies are applied to mobile terminals in the present disclosure, for identity authentication of a user at various conditions. It also replaces the existing application login ways utilizing a user name and a password. And the uniqueness of iris' features makes iris recognition more secure and also provides convenience to the user.

A technical solution adopted by the present disclosure in order to solve the technical problem is as following:

a processing method for identity authentication with a mobile terminal based on iris recognition, comprising:

collecting in advance by the mobile terminal iris characteristic data of a user, encapsulating the iris characteristic data into a designated function as iris identification data, and providing an interface to applications in the upper layer to invoke the function containing the iris identification data;

configuring the collected iris characteristic data to correlate with unlock command of screen of the mobile terminal, so as to establish the iris identification data as a unique identifier of the user for unlocking the mobile terminal;

binding the prestored iris identification data of the user with a login account of the application installed on the mobile terminal, for account verification to log on the application; and when it is desired to unlock the mobile terminal, scanning by a camera equipped in the mobile terminal the iris characteristic data of a current user, comparing the iris characteristic data of the current user against the prestored iris identification data, and when the iris characteristic data of the current user is in match with the prestored iris identification data, controlling the mobile terminal to unlock.

Another processing method for identity authentication with a mobile terminal based on iris recognition is provided, comprising:

collecting in advance by the mobile terminal iris characteristic data of a user, encapsulating the iris characteristic data to a designated function as iris identification data, providing an interface to applications in the upper layer to invoke the function containing the iris identification data, and establishing the iris identification data as a unique identifier of the user for identity authentication;

when it is desired to unlock the mobile terminal, scanning by a camera equipped in the mobile terminal the iris characteristic data of a current user, and comparing the iris characteristic data of the current user against the prestored iris identification data; and when the iris characteristic data of the current user is in match with the prestored iris identification data, controlling the mobile terminal to unlock.

In addition, a processing system for identity authentication with a mobile terminal based on iris recognition is provided, comprising:

a collect-pack-preset module, being configured to collect in advance by the mobile terminal iris characteristic data of a user, encapsulate the iris characteristic data to a designated function as iris identification data, provide an interface to applications in the upper layer to invoke the function containing the iris identification data, and establish the iris identification data as a unique identifier of the user for identity authentication; and an iris-unlock control module, being configured to, when it is desired to unlock the mobile terminal, scan by a camera equipped in the mobile terminal the iris characteristic data of a current user, compare the iris characteristic data of the current against the prestored iris identification data; when the iris characteristic data of the current user is in match with the prestored iris identification data, control the mobile terminal to unlock.

In the processing method and system for identity authentication with a mobile terminal based on iris recognition, iris recognition technologies are employed, and are directly integrated into the front camera of the mobile terminal. Thus, iris recognition technologies can be employed for user recognition under various profiles, replacing the existing ways of login on an application utilizing a username and a password. Once iris recognition succeeds with the mobile terminal, any applications on the client terminal will be logged in automatically and thus need no further identification. Therefore, the user no longer has to worry about forgetting various usernames or passwords if they need to be remembered. In addition, the mobile terminal is enabled with a new feature, i.e., iris recognition. The user only needs to look at the device, and the mobile terminal will scan the iris of the user and is then unlocked. The scanned iris data may be compressed and encrypted in a certain way. A small amount of the compressed and encrypted data can be used to apply for various application accounts. The accounts may be bound with the action of scanning to unlock. Thus, as long as the user succeeds in unlocking the mobile terminal, various applications that are successfully registered in the device can be logged in directly, eliminating the need of manually entering the user name and the password to log in. The uniqueness of iris features also provides higher security and enormous convenience to the user.

DETAILED DESCRIPTION OF THE DISCLOSURE

Figure 1:
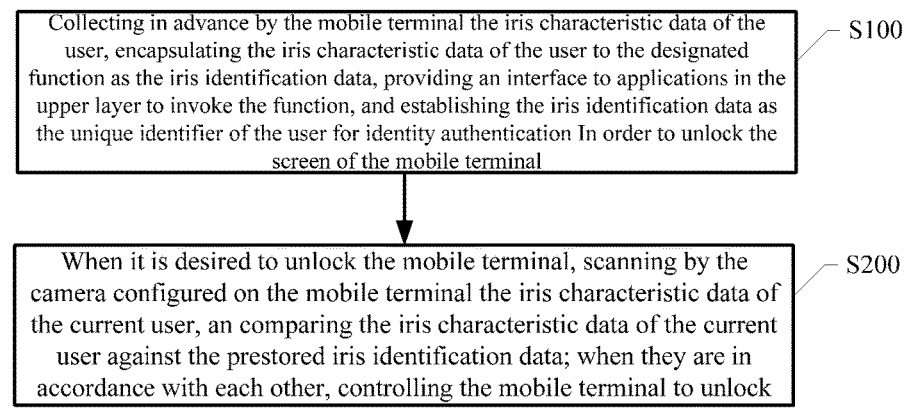
FIG. 1 is a flow chart diagram of a processing method for identity authentication with a mobile terminal based on iris recognition according to a first exemplary embodiment of the present disclosure.

Please refer to the accompanying drawings. Same symbols for components represent same components. Principles of the present disclosure are illustrated by examples implemented in an appropriate computing environment. The following description is based on specific example embodiments according to the present disclosure, which shouldn't be construed as limiting other specific embodiments that are not detailed herein according to the present disclosure.

In the following description, specific embodiments of the present disclosure will be described with reference to steps or symbols executed by one or more computers, unless otherwise stated. Therefore, these steps and operations will be mentioned more than once to be executed by computers. The computer operation referred to herein comprises operations performed by computer processing units, which represent electronic signals of the data within a structured type. These operations transform the data or maintain the data in the memory system of the computer, wherein the data can be reconfigured or otherwise change the functioning of the computer through means well known by one of ordinary skill in the art. The data structure maintained by the data is the physical location of the memory. The data structure comprises particular characteristics defined by the data format. Although the principles of the present disclosure are illustrated by the above text, it should not be construed as a limit to the present disclosure, and one of ordinary skill in the art will understand that the steps and operations described below can also be implemented by hardware.

The principles of the present disclosure are performed by utilizing a number of other general-purposed or special-purposed operation environments, communication environments or configurations. Examples of well known operation systems, operation environments and configurations applicable to the present disclosure can comprise, but are not limited to, hand-held phones, personal computers, servers, multi-processor systems, micro-computer based systems, main frame computers and distributed computing environments including any of the above mentioned systems or apparatuses.

The term "module" can be regarded as software objects executed on the computing system. The various components, modules, engines and services described herein can be regarded as objects implemented on the computing system. And the apparatuses and methods described herein are preferably implemented in the form of software, and can without doubt be implemented by hardware, both falling within the scope of claim of the present disclosure.

In the processing method and system for identity authentication with a mobile terminal based on iris recognition according to the present disclosure, iris recognition technologies are primarily applied. Iris recognition technologies have characteristics of uniqueness, stability and unchangeability. An exterior view of the human eye is comprised of three parts, the sclera, the iris and the pupil. Within the exterior view of the human eye, sclera is the outer white part of the eyeball, covering about 30 percent of the total superficial area of the exterior view; pupil is the central part of the eye, covering about 5 percent; iris is positioned between the sclera and the pupil, and contains most abundant texture information, covering about 65 percent. In appearance, iris is comprised of many crypts, folds and pigmented spots; it is one of the most unique structures within the human body. The formation of iris is determined by genes. Expression of human genes decides the form, physiology, color and overall appearance of the iris. Generally, the iris grows to a sufficient size at eight months of age of a fetus, and enters a relatively stable period. Unless some very rare conditions or huge physical or mental trauma may cause changes in the appearance of the iris, morphology of the iris can maintain for decades without any change. On the other hand, iris is externally visible, and it also belongs to internal tissues, seating behind the cornea. Thus, to change the appearance of the iris, extreme delicate surgery would be needed, and the vision is also risked to be impaired.

Mobile terminals, such as mobile phones, tablet computers or other computing devices with photographing functions, are generally provided with security measures, e.g., password or pattern lock. When the aforementioned security measures are not in use for a long time, or the password is newly modified, often the user will forget the security measure that is previously set up; most existing applications also provide separate security measures for entry into the applications, for example, password or pattern lock. Consequently, too many passwords and user names will be possibly forgotten or confused by the user.

In order to make the purposes and technical solutions and advantages of the present disclosure clear and definite, a detailed description will be made on the present disclosure with reference to the accompanying drawings and cited embodiments. It should be appreciated that the specific embodiments described herein are merely used to illustrate but not to limit the present disclosure.

Referring to FIG. 1, which is a flow chart diagram of a processing method for identity authentication with a mobile terminal based on iris recognition according to an exemplary embodiment of the present disclosure. The processing method for identity authentication with a mobile terminal based on iris recognition as shown in FIG. 1 comprises:

S100: collecting in advance by the mobile terminal iris characteristic data of a user, encapsulating the iris characteristic data to a designated function as iris identification data, providing an interface to applications in the upper layer to invoke the function containing the iris identification data, and establishing the iris identification data as a unique identifier of the user for identity authentication. For example, the iris identification data can be configured to be the unique identifier of the user. Therefore, the iris identification data can be utilized for identity authentication in order to unlock the screen of the mobile terminal.

That is, first a built-in camera of the mobile terminal will be aligned with the user's eye, whose iris characteristic data is to be collected. The eye will be photographed for a plurality of times, in order to collect and calculate the iris data of the eye. Thereafter, the mobile terminal establishes the photographed data as the user's distinctive iris feature by using a calculation function, and directly integrates the iris characteristic data into a designated function configured in the front camera of the mobile terminal, as the iris identification data during subsequent operations. The user can control the iris identification data in the mobile terminal to provide an interface to the upper-layer applications installed in the mobile terminal to invoke the function containing the iris identification data, and may further establish the iris identification data as the unique identifier of the user, for identity authentication in order to unlock the screen of the mobile terminal.

S200: when it is desired to unlock the mobile terminal, scanning by the camera equipped in the mobile terminal the iris characteristic data of a current user, comparing the iris characteristic data of the current user against the prestored iris identification data; when the iris characteristic data of the current user is in match with the prestored iris identification data, controlling the mobile terminal to unlock.

That is, when the user desires to turn on the mobile terminal, he/she may first lift the security state of the mobile terminal, making it enter a "to be used" state. The built-in camera in the mobile terminal can be directed towards the user's eye that is previously used to set the security measure, and continually photographs or records the image of the eye, or by any other scan methods, to obtain the iris characteristic data of the current user. The mobile terminal compares the obtained iris characteristic data of the current user against the prestored iris identification data. If the collected iris characteristic data of the current user is in match with the iris identification data prestored in the mobile terminal, the mobile terminal is controlled to unlock.

Further, in the step S100, establishing the iris identification data as the unique identifier of the user comprises: configuring the collected iris characteristic data to correlate with a screen unlock command of the mobile terminal, for unlocking the screen of the mobile terminal. Namely, the collected iris characteristic data can be utilized to unlock the screen of the mobile terminal; for detailed description, please see above.

In addition, the step S100 further comprises: binding the prestored iris identification data of the user with a login account of an application installed on the mobile terminal, for account verification to log on the application.

To be specific, the user may perform certain operations to bind the user's iris identification data that is previously stored in the mobile terminal with an account of an application that is installed in the mobile terminal. The user only needs to log into the account of the application, and manipulate a binding program to enable the iris identification data of the user with equivalent right as the application account for login on the application. Once the binding is completed, the user can, when operating on the application next time, directly log into the application depending on the authentication of the iris identification data.

In addition, the step S100 further comprises: providing a function containing the iris identification data to the application layer, providing by the application layer interface an interface to obtain the function containing the iris identification data, when the user clicks to obtain the iris identification data, acquiring the iris identification data of the user, and binding the iris identification data of the user with a login account of an application installed on the mobile terminal.

Namely, the mobile terminal provides the function containing the iris identification data to the application layer, and the application layer interface can provide an interface to acquire the function containing the iris identification data. When operating on the application layer, the user can click on the interface frame of the iris identification data that is set by the mobile terminal system, so as to acquire the prestored iris identification data of the user. Thus, the iris identification data of the user can be further configured to be bound with the login account of the application that is installed on the mobile terminal.

In the processing method and system for identity authentication with a mobile terminal based on iris recognition, iris recognition technologies are employed, and are directly integrated into the front camera of the mobile terminal. Thus, iris recognition technologies can be employed for user recognition under various profiles, replacing the existing ways of login on an application utilizing a username and a password. Once iris recognition succeeds with the mobile terminal, any applications on the client will be logged in automatically and thus need no further identification. The user only needs to look at the device, and the mobile terminal will scan the iris of the user and is then unlocked. The scanned iris data may be compressed and encrypted in a certain way. And a small amount of the compressed and encrypted data can be used to apply for various application accounts. The accounts may be bound with the action of scanning to unlock. Thus, as long as the user succeeds in unlocking the mobile terminal, various applications that are successfully registered in the device can be logged in directly, eliminating the need of manually entering the user name and the password to log in.

As can be seen, the present disclosure provides a processing method for identity authentication with a mobile terminal based on iris recognition. Iris recognition is employed to unlock the mobile terminal, thus enabling easy, practical and convenient operations. The uniqueness of the iris further provides even higher security.

A further detailed description will be made on the present disclosure with reference to specific embodiments.

Figure 2:
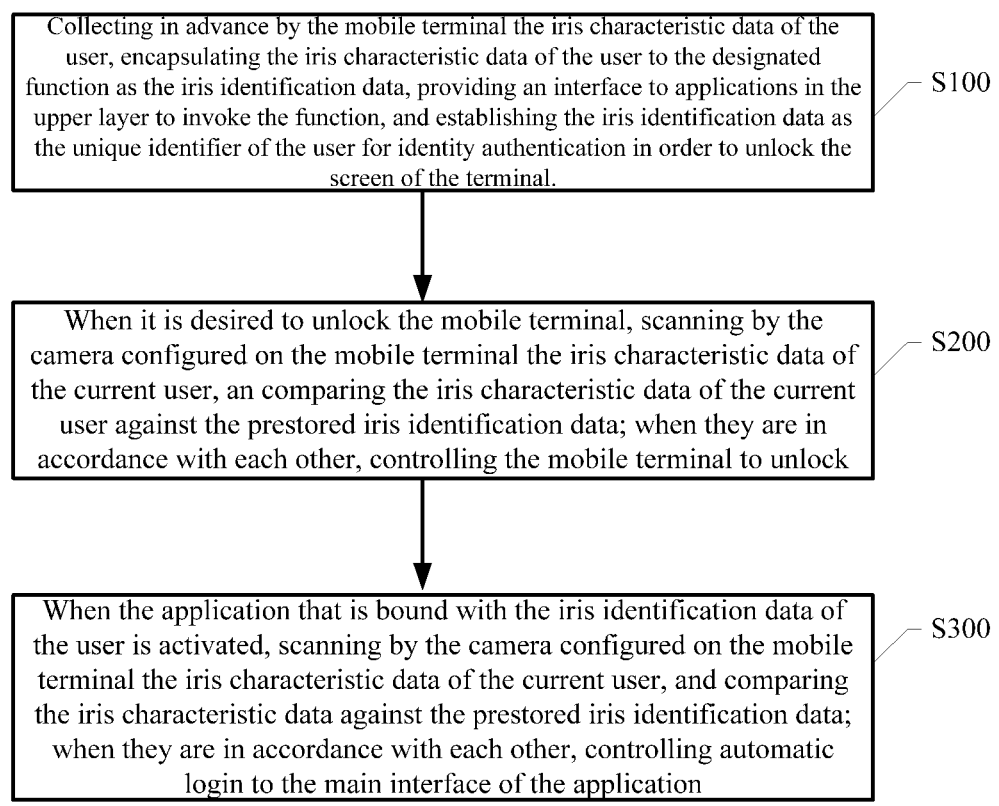
FIG. 2 is a flow chart diagram of a processing method for identity authentication with a mobile terminal based on iris recognition according to a second exemplary embodiment of the present disclosure.

A second embodiment according to the present disclosure is shown in FIG. 2.

S100: collecting in advance by the mobile terminal iris characteristic data of a user, encapsulating the iris characteristic data to a designated function as iris identification data, providing an interface to applications in the upper layer to invoke the function containing the iris identification data, and establishing the iris identification data as a unique identifier of the user for identity authentication so as to unlock the mobile terminal; for detailed description, please see above.

S200: when it is desired to unlock the mobile terminal, scanning by a camera equipped in the mobile terminal the iris characteristic data of a current user, comparing the iris characteristic data of the current user against the prestored iris identification data; when the iris characteristic data of the current user is in match with the prestored iris identification data, controlling the mobile terminal to unlock; for detailed description, please see above.

S300: when it is desired to activate an application that is bound with the iris identification data of the user, scanning by the camera equipped in the mobile terminal the iris characteristic data of the current user, comparing the iris characteristic data of the current user against the prestored iris identification data; when the iris characteristic data of the current user is in match with the prestored iris identification data, controlling automatically logging into a main interface of the application.

Namely, via authenticating with the iris identification data of the user, the mobile terminal can be successfully unlocked and entered into a main interface of the mobile terminal. When the user desires to activate an application, the mobile terminal system may detect whether the iris identification data of the user has been bound with the login account of the activated application, so as to determine whether the application is enabled to utilize the iris data for login.

If the mobile terminal system detects and determines that the activated application is not enabled with the function of login via the iris data, then the system will obtain the iris identification data prestored in the mobile terminal, and bind the iris identification data with the login account of the activated application, enabling the function of login via the iris data.

When activating an application that is bound with the iris identification data, the user can use the camera configured on the mobile terminal to scan the iris characteristic data of the current user, and compare the iris characteristic data of the current user against the prestored iris identification data to determine whether they are in match with each other. When the iris characteristic data of the current user is in match with the prestored iris identification data, the current user will be notified that his/her identity is authenticated, and he/she may control the mobile terminal to automatically log into the main interface of the application; and when the iris characteristic data of the current user is not in match with the prestored iris identification data, then the user will be notified that his/her identity is not authenticated or that another verification is needed.

Figure 3:
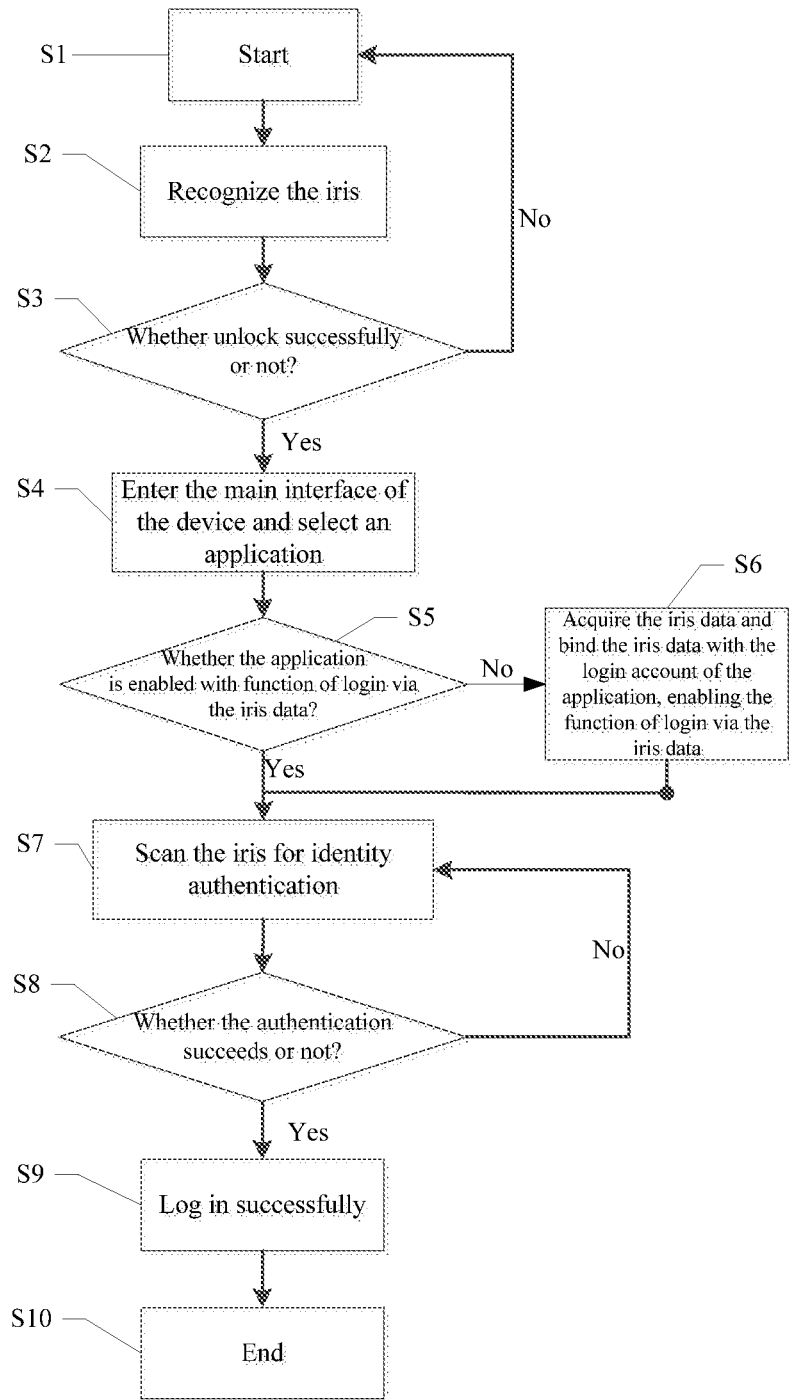
FIG. 3 is a flow chart diagram of a processing method for identity authentication with a mobile terminal based on iris recognition according to a third exemplary embodiment of the present disclosure.

In order to make the technical features of the present disclosure more fully understood, the processing method for identity authentication with a mobile terminal based on iris recognition according to the present disclosure will be further described, as shown in FIG. 3.

S1: start.

S2: recognize the iris.

Namely, the user stares at the camera of the mobile terminal, and manipulates the mobile terminal to collect the iris data of the user. Collection methods comprise, but is not limited to, photographing, video recording or other scan methods.

S3: unlock successfully or otherwise.

Namely, after the iris data of the user is collected by the mobile terminal, the mobile terminal system will determine whether the currently collected iris data is in match with the prestored iris data in the mobile terminal. If the currently collected iris data is in match with the prestored iris data in the mobile terminal, then directing to step S4; otherwise, prompting for another verification for unlocking.

S4: enter a main interface of the device, and select an application

Namely, when the currently collected iris data of the user is in match with the prestored iris data in the mobile terminal, the mobile terminal is unlocked successfully and entered its main interface, where the user can select any applications that are desired to be checked.

S5: determine whether the application is enabled with the function of login via the iris data.

When the user selects an application that is to be checked, the mobile terminal system will detect whether the application has been enabled with the function of login via the iris data, when the result indicates that the application is enabled with the function of login via the iris data, then directly going to step S7; otherwise going to step S6.

S6: acquire the iris data and bind the iris data with the account of the application, achieving the function of login via the iris data.

Namely, when the application manipulated by the user is not enabled with the function of login via the iris data, the mobile terminal system will acquire the iris data of the user and bind it with the account of the application currently manipulated by the user, enabling the function of login via the iris data. When the binding is completed, going to step S7.

S7: scan the iris for identity authentication.

S8: determine whether the authentication succeeds or not.

Namely, when the application manipulated by the user is enabled with the function of login via the iris data, the mobile terminal will again verifies the iris data of the current user, so as to determine whether the iris data of the current user is in match with the iris identification data prestored in the mobile terminal, if the iris data of the current user is in match with the prestored iris identification data, going to step S9; otherwise, proceeding with the step S8 for another authentication.

S9: log in successfully.

S10: end. The user can get access to the application that is desired to be manipulated, and thus take a browse in the application interface.

Figure 4:
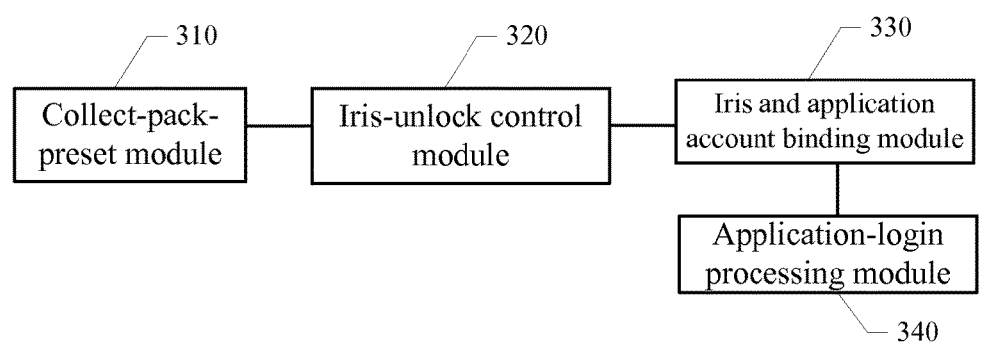
FIG. 4 is a block diagram of a processing system for identity authentication with a mobile terminal based on iris recognition according to an exemplary embodiment of the present disclosure.

Based on the above embodiments, a processing system for identity authentication with a mobile terminal based on iris recognition is provided, as is shown in FIG. 4, comprising:

a collect-pack-preset module 310, being configured to collect in advance by the mobile terminal iris characteristic data of a user, encapsulate the iris characteristic data to a designated function as iris identification data, provide an interface to the applications in the upper layer to invoke the function containing the iris identification data, and establish the iris identification data as a unique identifier of the user for identity authentication for unlocking the screen of the mobile terminal;

an iris-unlock control module 320, being configured to, when it is desired to unlock the mobile terminal, scan by a camera equipped in the mobile terminal the iris characteristic data of a current user, compare the iris characteristic data of the current user against the prestored iris identification data; when the iris characteristic data of the current user is in match with the prestored iris identification data, control the mobile terminal to unlock.

The processing system for identity authentication with a mobile terminal based on iris recognition further comprises:

an iris and account binding module 330, being configured to bind the prestored iris identification data of the user with a login account of an application installed on the mobile terminal, for account verification to log on the application;

an application-login processing module 340, being configured to, when it is desired to activate an application that is bound with the iris identification data of the user, scan by the camera equipped in the mobile terminal the iris characteristic data of the current user, compare the iris characteristic data of the current user against the prestored iris identification data; when the iris characteristic data of the current user is in match with the prestored iris identification data, control automatically logging into a main interface of the application; for detailed description, please see above.

In the processing system for identity authentication with a mobile terminal based on iris recognition, the collect-pack-preset module 310 comprises:

a collecting and packing unit, being configured to collect in advance by the mobile terminal iris characteristic data of the user, encapsulate the iris characteristic data to a designated function as iris identification data, and provide an interface to the applications in the upper layer to invoke the function containing the iris identification data;

a setting module, being configured to arrange the collected iris characteristic data to correlate with the unlock command of screen of the mobile terminal, for unlocking the screen of the mobile terminal; and an interface provision module, being configured to provide the function containing the iris identification data to the application layer, provide by the application layer interface an interface to obtain the function containing the iris identification data, when the user clicks to obtain the iris identification data, acquire the iris identification data of the user, and bind the iris identification data of the user with a login account of an application installed on the mobile terminal.

In the processing system for identity authentication with a mobile terminal based on iris recognition, the application login processing module 340 comprises:

a detecting and judging unit, being configured to, when the mobile terminal is unlocked successfully and enters its main interface, and an application is activated, detect whether the iris identification data of the user is bound with the login account of the application that is activated, so as to determine whether the application is enabled with the function of login via the iris data;

a loading and binding unit, being configured to acquire the prestored iris identification data and bind the iris identification data of the user with the login account of the application that is to be activated, so as to achieve the function of login via the iris data;

a scanning and comparing unit, being configured to scan by the camera equipped in the mobile terminal the iris characteristic data of a current user, and compare the iris characteristic data of the current user against the prestored iris identification data, so as to determine whether they are in match with each other or not;

a verification-success control module, being configured to, when the identification is authenticated successfully, control automatic login to the main interface of the application;

a verification-failure control unit, being configured to, when the identification fails to pass the verification, prompt the user for login failure; for detailed description, please see above.

Furthermore, it is apparent to those skilled in the art that, the present disclosure also provides a processing system for identity authentication with a mobile terminal based on iris recognition, the system comprising a non-transitory program storage medium and a processor. The non-transitory program storage medium stores a program executed by the processor to perform the methods as described in above. Furthermore, it is apparent to those skilled in the art that, various modules 310, 320, 330, 340 as shown in FIG. 4 are software modules or software units. In another aspect, it is well-known that various software modules or software units inherently are stored in the non-transitory program storage medium and executed by the processor.

It should be appreciated that the application of the present disclosure should not be limited to the above examples, which can be improved or transformed by one of ordinary skill in the art according to the above description. Any improvements or transformations should all be covered within the protection scope of the appended claims of the present disclosure.

What is claimed is:

1. A processing method for identity authentication with a mobile terminal based on iris recognition, comprising:

collecting in advance, by the mobile terminal, iris characteristic data of a user, encapsulating the iris characteristic data to a designated function as stored iris identification data, and providing an interface to applications in an upper layer to invoke the function containing the stored iris identification data;

configuring the collected iris characteristic data to correlate with an unlock command of a screen of the mobile terminal, so as to establish the stored iris identification data as a unique identifier of the user for unlocking the mobile terminal;

binding the stored iris identification data of the user with a login account of an application installed on the mobile terminal, for account verification to log on the application;

when unlocking the mobile terminal, scanning, by a camera equipped in the mobile terminal, iris characteristic data of a current user, comparing the iris characteristic data of the current user against the stored iris identification data;

when the iris characteristic data of the current user matches with the stored iris identification data, unlocking the mobile terminal and logging into applications bound with the stored iris identification data;

when the mobile terminal is unlocked successfully, and another application is activated, detecting whether the stored iris identification data of the user is bound with the login account of the other application that is activated, in order to determine whether the other application is enabled with a function of login via the iris stored identification data; and upon determining that the stored iris identification data of the user is not bound with the login account of the other application, binding the stored iris identification data with the login account of the other application that needs to be activated, in order to enable the function of login via the stored iris identification data.

2. The processing method according to claim 1, wherein the step of binding the stored iris identification data with the login account of the application installed on the mobile terminal comprises:

providing the function containing the stored iris identification data to an application layer, and providing by an application layer interface an interface for acquiring the stored iris identification data; and when the stored iris identification data is acquired by clicking, binding the stored iris identification data with the login account of the application installed on the mobile terminal.

3. The processing method according to claim 1, further comprising, after the step of controlling the mobile terminal to unlock:

when the application that is bound with the stored iris identification data is activated, controlling automatically log into a main interface of the application.

4. The processing method according to claim 1, further comprising, after the step of acquiring the stored iris identification data, and binding the stored iris identification data with the login account of the application that needs to be activated, in order to enable the function of login via the stored iris identification data:

scanning, by the camera equipped in the mobile terminal, the iris characteristic data of the current user, and comparing the iris characteristic data of the current user against the stored iris identification data; and when the iris characteristic data of the current user matches with the stored iris identification data and thus the identity of the current user is authenticated, controlling automatically log into a main interface of each of the plurality of applications.

5. The processing method according to claim 4, further comprising, after the step of comparing the iris characteristic data of the current user against the stored iris identification data:

when the iris characteristic data of the current user does not match with the stored iris identification data, prompting the user for login failure.

6. The processing method according to claim 4, further comprising, after the step of detecting whether the stored iris identification data of the user is bound with the login account of the other application that is activated:

when the stored iris identification data of the user is determined to be bound with the login account of the other application that is activated, scanning by the camera configured on the mobile terminal the iris characteristic data of the current user, and comparing the iris characteristic data of the current user against the stored iris identification data; and when the iris characteristic data of the current user matches with the stored iris identification data and thus the identity is authenticated, controlling automatically log into the main interface of the application.

7. The processing method according to claim 6, further comprising, after the step of comparing the iris characteristic data of the current user against the stored iris identification data:

when the iris characteristic data of the current user does not match with the stored iris identification data, prompting the user for login failure.

8. A processing method for identity authentication with a mobile terminal based on iris recognition, comprising:

collecting in advance, by the mobile terminal, iris characteristic data of a user, encapsulating the iris characteristic data to a designated function as stored iris identification data, providing an interface to applications in an upper layer to invoke the function containing the stored iris identification data, and establishing the stored iris identification data as a unique identifier of the user for identity authentication;

when unlocking the mobile terminal, scanning, by a camera equipped in the mobile terminal, iris characteristic data of a current user, and comparing the iris characteristic data of the current user against the stored iris identification data;

when the iris characteristic data of the current user matches the stored iris identification data, controlling the mobile terminal to unlock;

when the mobile terminal is unlocked successfully, and an application is activated, detecting whether the stored iris identification data is bound with a login account of the application that is activated, so as to determine whether the application is enabled with a function of login via the stored iris identification data; and upon detecting that the stored iris identification data of the user is not bound with the login account of the application, the mobile terminal binding the stored iris identification data with the login account of the application that needs to be activated, in order to enable the function of login via the stored iris identification data.

9. The processing method according to claim 8, wherein the step of establishing the stored iris identification data as the unique identifier of the user for identity authentication comprises:

configuring the collected iris characteristic data of the user to correlate with an unlock command of a screen of the mobile terminal, for unlocking the screen of the mobile terminal.

10. The processing method according to claim 8, further comprising:

binding the stored iris identification data of the user with a login account of an application installed on the mobile terminal, for account verification to log into the application.

11. The processing method according to claim 10, wherein the step of binding the stored iris identification data of the user with the login account of the application installed on the mobile terminal comprises:

providing the function containing the stored iris identification data to an application layer, providing by an application layer interface an interface to acquire the function containing the stored iris identification data, when the user clicks to acquire the stored iris identification data, acquiring the stored iris identification data of the user, and binding the stored iris identification data of the user with the login account of the application installed on the mobile terminal.

12. The processing method according to claim 8, further comprising, after the step of controlling the mobile terminal to unlock:

when an application that is bound with the stored iris identification data of the user is activated, scanning, by the camera equipped on the mobile terminal, the iris characteristic data of the current user, and comparing the iris characteristic data of the current user against the stored iris identification data; and when the iris characteristic data of the current user matches the stored iris identification data, controlling automatically log into a main interface of the application.

13. The processing method according to claim 10, further comprising, after the step of controlling the mobile terminal to unlock:

scanning, by the camera configured in the mobile terminal, the iris characteristic data of the current user, and comparing the iris characteristic data of the current user against the stored iris identification data to determine whether the iris characteristic data of the current user matches with the stored iris identification data;

when the iris characteristic data of the current user matches with the stored iris identification data and thus the identity of the current user is authenticated, controlling automatically log into a main interface of the application; and when the iris characteristic data of the current user does not match with the stored iris identification data, prompting the user for login failure.

14. The processing method according to claim 8, further comprising, after the step of detecting whether the stored iris identification data of the user is bound with the login account of the application that is activated:

when the stored iris identification data of the user is determined to be bound with the login account of the application that is activated, scanning by the camera configured on the mobile terminal the iris characteristic data of the current user, and comparing the iris characteristic data of the current user against the stored iris identification data; and when the iris characteristic data of the current user matches with the stored iris identification data and thus the identity is authenticated, controlling automatically log into the main interface of the application; and when the iris characteristic data of the current user does not match with the stored iris identification data, prompting the user for login failure.

15. A processing system for identity authentication with a mobile terminal based on iris recognition, comprising:

a processor; and a non-transitory program storage medium, comprising:

a collect-pack-preset module, being configured to collect in advance, by the mobile terminal, iris characteristic data of a user, encapsulate the iris characteristic data to a designated function as stored iris identification data, provide an interface to applications in an upper layer to invoke the function containing the stored iris identification data, and establish the stored iris identification data as a unique identifier of the user for identity authentication;

an iris and account binding module, being configured to bind the stored iris identification data of the user with a login account of an application installed on the mobile terminal, for account verification to log on the application;

an iris-unlock control module, being configured to scan, by a camera configured in the mobile terminal, the iris characteristic data of a current user, compare the iris characteristic data of the current user against the stored iris identification data; when the iris characteristic data of the current user matches with the stored iris identification data, control the mobile terminal to unlock; and an application-login processing module, being configured to log into the application bound with the stored iris identification of the user when the mobile terminal is unlocked;

wherein the application-login processing module further comprises:

a detecting and judging unit, being configured to, when the mobile terminal is unlocked successfully, and another application is activated, detect whether the stored iris identification data of the user is bound with a login account of the other application that is activated, so as to determine whether the other application is enabled with a function of login via the stored iris identification data;

a loading and binding unit, being configured to, upon the detection that the stored iris identification data of the user is not bound with the login account of the other application, bind the stored iris identification data with the login account of the other application that needs to be activated, in order to achieve the function of login via the stored iris identification data.

16. The processing system according to claim 15, wherein the collect-pack-preset module comprises:

a collecting and packing unit, being configured to collect in advance, by the mobile terminal, the iris characteristic data of the user, encapsulate the iris characteristic data to the designated function as stored iris identification data, and provide the interface to the applications in the upper layer to invoke the function containing the stored iris identification data;

a setting unit, being configured to configure the collected iris characteristic data to correlate with an unlock command of a screen of the mobile terminal, for unlocking the screen of the mobile terminal; and an interface provision unit, being configured to provide the function containing the stored iris identification data to the application layer, provide by an application layer interface an interface to obtain the function containing the stored iris identification data, when the user clicks to obtain the stored iris identification data, acquire the stored iris identification data of the user, and bind the stored iris identification data of the user with a login account of an application installed on the mobile terminal.

17. The processing system according to claim 15, wherein the application-login processing module comprises:

a scanning and comparing unit, being configured to scan by the camera configured in the mobile terminal the iris characteristic data of the current user, and compare the iris characteristic data of the current user against the stored iris identification data, in order to determine whether the iris characteristic data of the current user matches with the stored iris identification data;

a verification-success control unit, being configured to, when the iris characteristic data of the current user matches with the stored iris identification data, control automatically log into a main interface of the application; and a verification-failure control unit, being configured to, when the iris characteristic data of the current user does not match with the stored iris identification data, prompt the user for login failure.

* * * * *